US011068536B2

(12) United States Patent
Huang et al.

(10) Patent No.: US 11,068,536 B2
(45) Date of Patent: Jul. 20, 2021

(54) METHOD AND APPARATUS FOR MANAGING A DOCUMENT INDEX

(71) Applicant: EMC IP Holding Company LLC, Hopkinton, MA (US)

(72) Inventors: Kun Wu Huang, Shanghai (CN); Winston Lei Zhang, Shanghai (CN); Chao Chen, Shanghai (CN); Jingjing Liu, Shanghai (CN); Duke Hongtao Dai, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 623 days.

(21) Appl. No.: 15/630,168

(22) Filed: Jun. 22, 2017

(65) Prior Publication Data

US 2017/0371978 A1    Dec. 28, 2017

(30) Foreign Application Priority Data

Jun. 22, 2016   (CN) .......................... 201610457468.2

(51) Int. Cl.
| | | |
|---|---|---|
| *G06F 16/30* | (2019.01) | |
| *G06F 16/901* | (2019.01) | |
| *G06F 16/93* | (2019.01) | |
| *G06F 16/31* | (2019.01) | |

(52) U.S. Cl.
CPC .......... *G06F 16/901* (2019.01); *G06F 16/328* (2019.01); *G06F 16/93* (2019.01)

(58) Field of Classification Search
CPC .. G06F 16/9537; G06F 16/252; G06F 16/901; G06F 16/328

USPC ........ 707/609, 687, 705, 769, 790, 813, 821
See application file for complete search history.

(56) References Cited

U.S. PATENT DOCUMENTS

| | | | | |
|---|---|---|---|---|
| 5,899,988 | A | * | 5/1999 | Depledge ................ G06F 16/22 |
| 8,489,676 | B1 | * | 7/2013 | Chaplin ................ G06F 16/113 |
| | | | | 709/203 |
| 9,152,716 | B1 | | 10/2015 | Triandopoulos et al. |
| 9,779,132 | B1 | | 10/2017 | Bauer et al. |
| 10,296,650 | B2 | * | 5/2019 | Tripathi .............. G06F 16/9537 |
| 10,498,355 | B2 | | 12/2019 | Hong et al. |
| 2010/0131530 | A1 | * | 5/2010 | Gibson ............... G06F 16/9537 |
| | | | | 707/758 |

(Continued)

FOREIGN PATENT DOCUMENTS

| | | |
|---|---|---|
| CN | 1536509 | 10/2004 |
| CN | 1858747 | 11/2006 |

(Continued)

*Primary Examiner* — Sana A Al-Hashemi
(74) *Attorney, Agent, or Firm* — BainwoodHuang (57) ABSTRACT

Embodiments of the present disclosure relate to a method and apparatus for managing a document index. The method comprises determining an independently updatable field in a plurality of documents, the independently updatable field comprising at least one item. The method further comprises creating an index for an item in the independently updatable field, the index containing an identifier of a document comprising the item, the document being included in the plurality of documents. Furthermore, the method further comprises storing the identifier of the document in blocks such that the index is updatable without modifying the identifier of the document.

9 Claims, 9 Drawing Sheets

(56) References Cited

U.S. PATENT DOCUMENTS

| | | | |
|---|---|---|---|
| 2014/0068367 A1* | 3/2014 | Zhang | H03M 13/2957 714/752 |
| 2014/0164352 A1* | 6/2014 | Denninghoff | H03H 9/25 707/711 |
| 2015/0019480 A1* | 1/2015 | Maquaire | G06F 16/23 707/609 |
| 2017/0270114 A1 | 9/2017 | Dai et al. | |
| 2019/0220443 A1 | 7/2019 | Wang et al. | |

FOREIGN PATENT DOCUMENTS

| | | |
|---|---|---|
| CN | 101136013 | 3/2008 |
| CN | 101246500 | 8/2008 |
| CN | 101404034 | 4/2009 |
| CN | 101460949 | 6/2009 |

\* cited by examiner

METHOD AND APPARATUS FOR MANAGING A DOCUMENT INDEX

RELATED APPLICATIONS

This application claim priority from Chinese Patent Application Number CN201610457468.2, filed on Jun. 22, 2016 at the State Intellectual Property Office, China, titled "METHOD AND DEVICE OF MANAGING A DOCUMENT INDEX" the contents of which is herein incorporated by reference in its entirety.

FIELD

Embodiments of the present disclosure generally relate to a full text index, and more specifically, to a method and apparatus for managing a document index.

BACKGROUND

In an enterprise search system, the content and other metadata fields (attributes of documents, such as subject, author, keywords, creation date, document category, comments and the like) of documents are always indexed, After a document has been added to the search system, it may be modified later again and again. For example, an author may adjust keywords, a reader may add comments, and an administrator may add tags. This type of frequent partial update to documents is critical for applications which require a lot of collaboration, like document reviewing system (one document's review state may be changed frequently), and WIKI (a lot of users may update different document attributes).

The current search systems are mostly of an inverted index architecture, in which the inverted index is used to store mappings of storage positions of an item in a document or document set under a fulltext index. Normally, to update an existing document, for most of the inverted-index-based search systems, an old identifier corresponding to an old version of the document has to be deleted before adding a new version of the document. Further, after the new version of the document is added, a new identifier is assigned to the new version of the document and the item files corresponding to all, the items that appear in the new version of the document are modified, thereby reconstructing the inverted index. Although from the end-user's perspective, only some minor changes are made to the document, much more complicated operations must be performed for the underlying fulltext index search system to support the minor changes of the document. Sometimes, the frequent updating operations for the documents cause much heavier load than normal document adding operations. As a result, the search system fails to process an operation from the end user during document updating.

Therefore, it is a hot topic to enable an enterprise search system to quickly perform a partial update to a document. However, limited by an inverted index, a lot of attempts for a partial update to a document cannot find industrial application.

SUMMARY

To solve the above and other potential problems, embodiments of the present disclosure provide a method and apparatus for managing a document index.

According to a first aspect of the present disclosure, there is provided a method for managing a document index. The method comprises determining an independently updatable field in a plurality of documents, the independently updatable field including at least one item. The method further comprises creating an index for an item in the independently updatable field, the index containing an identifier of a document comprising the item, the document being included in the plurality of documents. Furthermore, the method further comprises storing the identifier of the document in blocks such that the index is updatable without modifying the identifier of the document.

According to a second aspect of the present disclosure, there is provided an apparatus for managing a document index. The apparatus comprises at least one processing unit and at least one memory. The at least one memory is coupled to the at least one processing unit and stores instructions to be executed by the at least one processing unit, the instructions, when executed by the at least one processing unit, causing the apparatus to: determine an independently updatable field in a plurality of documents, the independently updatable field including at least one item; create an index for an item in the independently updatable field, the index containing an identifier of a document comprising the item, the document being included in the plurality of documents; and store the identifier of the document in blocks such that the index is updatable without modifying the identifier of the document.

According to a third aspect of the present disclosure, there is provided a computer program product which is tangibly stored on a non-transient computer-readable medium and comprises machine executable instructions which, when executed, cause a machine to perform any acts of the method described according to the first aspect of the present disclosure.

With the following description, it will be understood that the present disclosure provides a solution for updating a field of a document independently in an index. The purpose of the present disclosure is to improve speed and efficiency of updating a document partially while maintaining a normal index (adding and removing a document) and query capability identical to a traditional inverted index, thereby saving indexing costs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent from more detailed description of some embodiments of the present disclosure with reference to the accompanying drawings, in which the same reference symbols are used to indicate the same elements.

DETAILED DESCRIPTION OF EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

In a search system, for instance, an enterprise search system, a document is indexed automatically whether it is added, removed, queried or updated. For a plurality of metadata fields configured for a document (attributes of a document, such as subject, author, keywords, creation date, document category, comments and the like), a large amount of updating may be applied to only a specific field, namely, only a part of the document, or even a tiny portion of the document. In the search system, any update to a document requires removing an identifier for an old version of the document and adding an identifier for a new version of the document, although the new version and the old version only differ slightly. When some metadata fields of a document are indexed to the fulltext index, any update to the document would trigger reconstruction of the index for the whole document (including all the metadata fields of the document), which is a waste as the whole document (including all the metadata fields of the document) has to be processed again and again, a majority of which is unnecessary.

To at least in part solve the above and other potential problems, example embodiments of the present disclosure provide a solution for managing a document index. The solution divides all the fields of documents into two categories: independently updatable fields and non-independently-updatable fields. An index for an item in an independently updatable field is stored in a specific manner such that the index for the item in the independently updatable field can be updated without modifying an identifier of a document.

Figure 1:
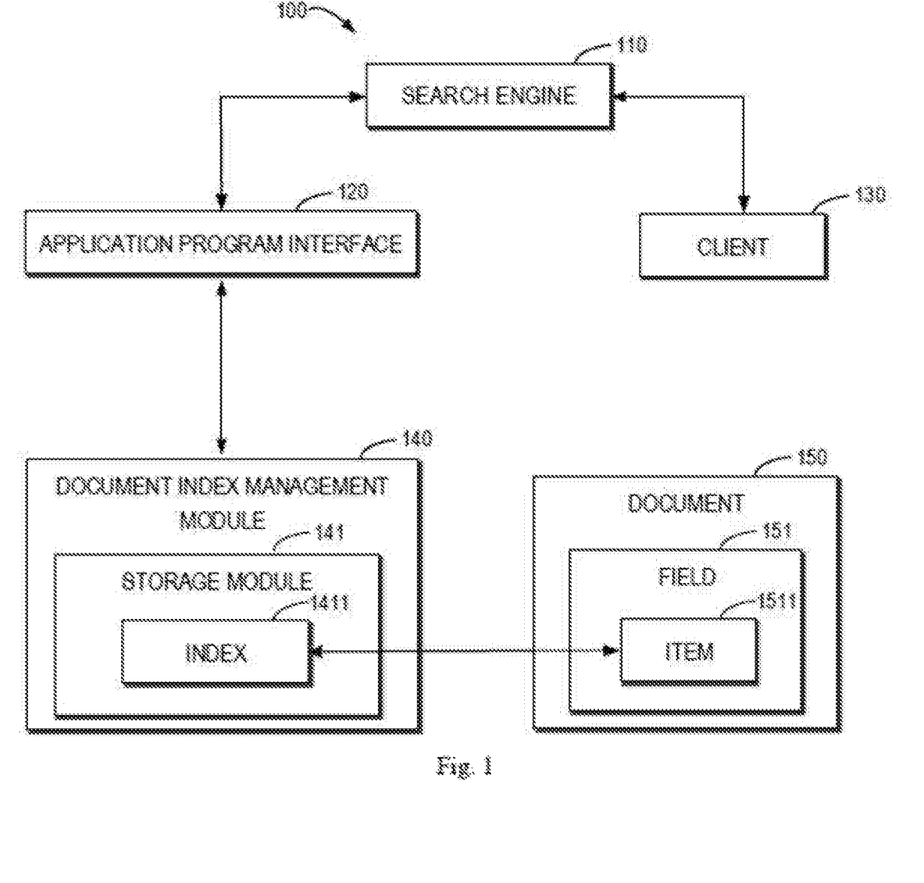
FIG. 1 illustrates a block diagram of an architecture for managing a document index according to an embodiment of the present disclosure.

FIG. 1 illustrates a block diagram of an architecture 100 for managing a document index according to an embodiment of the present disclosure. It should be understood that the structure and function of the architecture 100 are described only for example purpose instead of implying any limit to the scope of the present disclosure. The embodiments of the present disclosure can be embodied in different structures and/or functions.

As shown in FIG. 1, the architecture 100 may include: a search engine 110, an application program interface 120, a client 130, a document index management module 140 and a document 150. The client 130 can send, a request like searching (or querying) a document, adding a document, removing a document or updating a document, etc. to the search engine 110 which invokes the application program interface 120 to make response to the request from the client 130. For instance, when receiving a search request for a keyword from the client 130, the search engine 110 invokes the application program interface 120 for searching and provides the search result to the client 130. The search result may include a list of documents containing the keyword.

The application program interface 120 achieves functions of searching (or querying) a document, adding a document, removing a document and updating a document and so on by means of the document index management module 140 which includes a storage module 141 stored with an index 1411 for a plurality of documents 150.

A document 150 among a plurality of documents for which an index is created in the architecture 100 includes a field 151 which contains an item 1511. The field 151, for instance, is the content of the document 150, and a metadata field such as subject, author, keywords, creation date, document category, comments of the document. Each item 1511 in the field 151 is, for instance, each word contained by the field. As an example, the field 151 denotes the author of the document, "LI MING", then the field 151 contains two items 1511: "LI" and "MING". In other words, the item can be understood as a single word, The index 1411 stored in the storage module 141 includes for each item a list of documents 150 in which the item 1511 appears. For instance, the index 1411 can be represented as:

item—>list of document identifiers where the document identifier can be a serial number configured for a document in the index, for example, document 1, document 2, document 3 and the like. For instance, the index 1411 can be represented as:

item—>document 1, document 4, document 10, document 100, document 120.

Figure 2A:
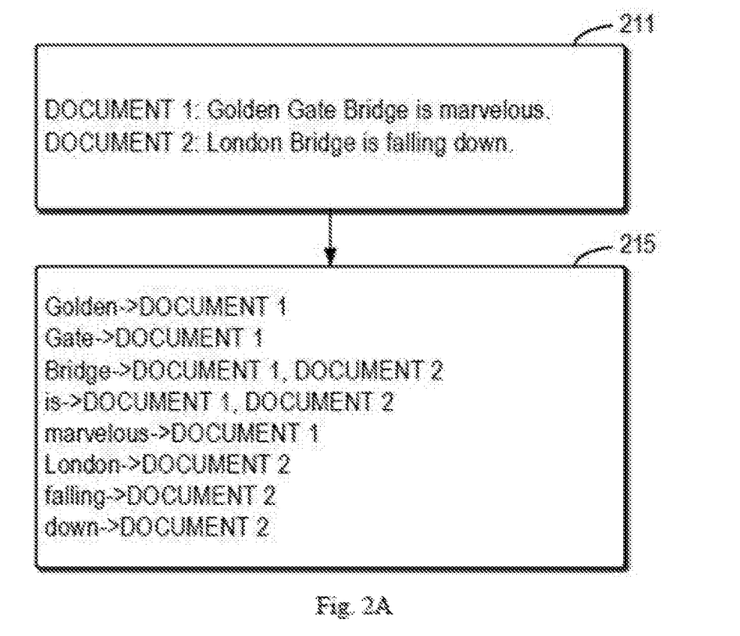
FIG. 2A illustrates a schematic diagram for creating an index for an item in two documents.

FIG. 2A illustrates a schematic diagram for creating an index 1411 for an item in two documents, in which block 211 illustrates content of two documents, namely, document 1 and document 2, in other words, the field denotes the content of a document. Though only one field is shown here, in other embodiments, the document may include other fields such as subject, author, keywords, creation date, document category; and comments. Block 215 illustrates the index 1411 that is created for each item in the content field and represents a relation between an item and a document, in which "document 1" and "document 2" are document identifiers.

Alternatively, the index 1411 can be represented as:

item—>list of document identifiers (n)

where n denotes a frequency of the item appearing in a particular document. Alternatively, the index 1411 may also include information of the position that the item appears in the document. When the index 1411 also includes the position information of the item, item query can be expanded to phrase query.

When receiving a search (or query) request for a particular item 1511 from the client 130, the document index management module 140 provides a list of documents in which a particular item 1511 appears to the search engine 110 according to the relation between an item and a document included in the index 1411. In some embodiments, the searched documents can be ranked according to the frequency of the item appearing in the document.

When receiving a request of adding, removing or updating documents etc. from the client 130, the document index management module 140 modifies the index 1411 stored in the storage module 141. In a conventional approach, the index 1411 is an inverted index. When receiving a request of adding a document, the document index management module 140 assigns a document identifier (for example, document 100) to the document to be added and adds the document identifier of document 100 into the index 1411. When receiving a request of removing a document, the document index management module 140 deletes the identifier of the document from the index 1411 or adds a deletion mark to the identifier of the document in the index 1411.

Figure 2B:
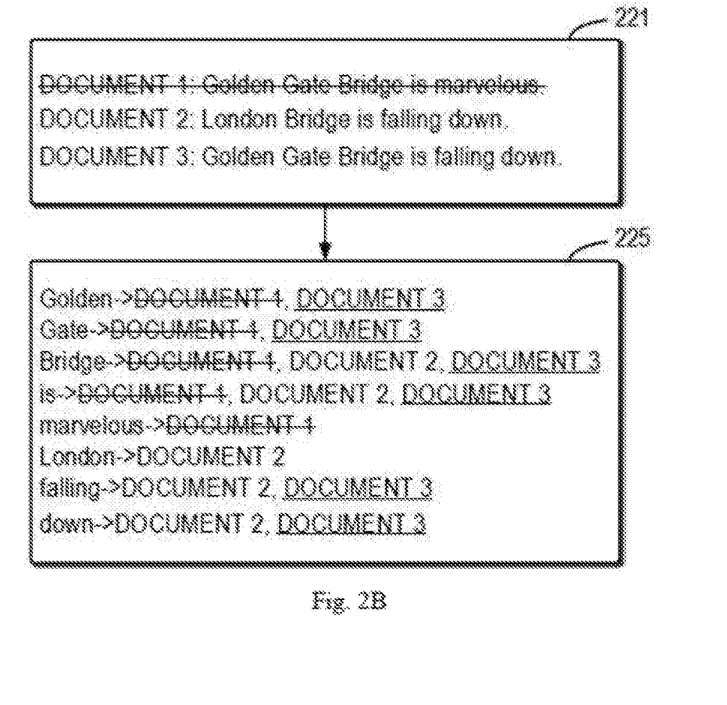
FIG. 2B illustrates a schematic diagram for updating a document in the example shown in FIG. 2A according to a traditional inverted index.

FIG. 2B illustrates a schematic diagram of updating a document in the example shown in FIG. 2A according to a traditional inverted index. Block 221 illustrates a partial modification made to document 1, namely, updating document 1 (for example, "marvelous" is replaced with "falling down" in document 1); block 225 illustrates the index 1411 after updating document 1. When receiving a request for updating a document (for example, document 1), in the conventional approach, the document index management module 140 adds a deletion mark to the identifier (for example, document 1) of the old version of the document to be updated in the index 1411, assigns a new document identifier (for example, document 3) to the new version of the document to be updated, and adds the new document identifier of document 3 into the index 1411. As shown in FIG. 2B, under this condition, due to change of the identifier of the document (from document 1 to document 3), though document 1 is modified partially (for example, "marvelous" is replaced with "falling down" in document 1), the indexes for all the items that appear in document 1 and document 3 should be modified, which reduces document updating efficiency significantly. Furthermore, if other fields other than the content of the document exist, since the identifier of the document changes, the indexes for items in other fields that do not change should be changed wholly, which would reduce document updating efficiency significantly.

The solution for managing a document index according to the embodiments of the present disclosure can improve document updating efficiency while maintaining performance of searching (or querying), adding and removing a document.

Figure 3:
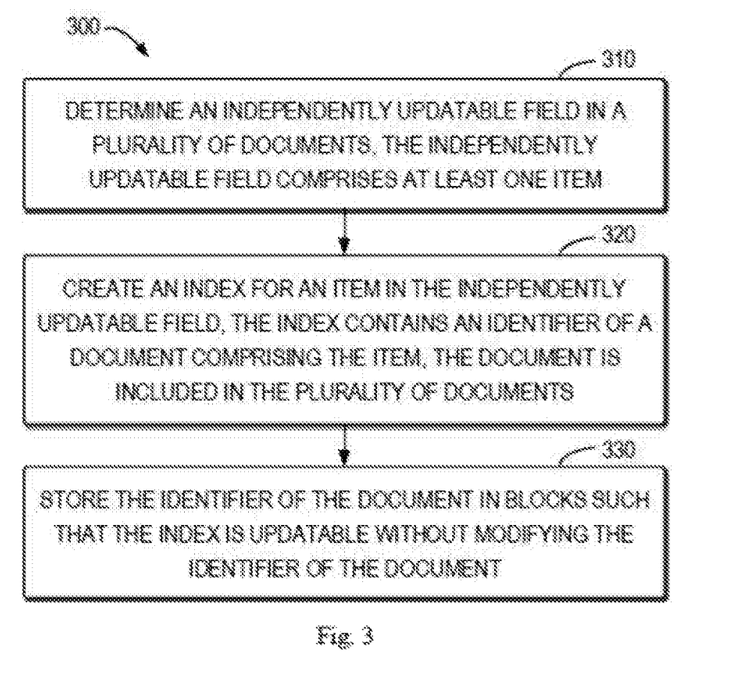
FIG. 3 illustrates a flowchart of a method for managing a document index according to an embodiment of the present disclosure.

The embodiments of the present disclosure will be described in greater detail with reference to FIGS. 3-7. FIG. 3 illustrates a flowchart of a method 300 for managing a document index according to an embodiment of the present disclosure. For example, the method 300 can be implemented by the document index management module 140 shown by FIG. 1. It should be understood that the method 300 may further include additional acts that are not shown and/or omit some acts as shown. The scope of the present disclosure is not limited in this regard.

At act 310, the document index management module 140 determines an independently updatable field in a plurality of documents 150, the independently updatable field including at least one item. In some embodiments, the document index management module 140 can divide all the fields 151 in a plurality of documents 150 into two categories: independently updatable fields and non-independently-updatable fields. In some embodiments, the independently updatable fields should be those relatively simple fields. For example, the content of these fields should be rather short. In other words, the number of items of an independently updatable field is below a predetermined threshold. For example, those fields with items whose maximum possible number does not exceed several words can be determined as independently updatable fields. With the following description, it will be understood that this act is beneficial for efficient updating and maintenance of the index.

The document index management module 140 can determine an independently updatable field from a plurality of documents such that the number of items included in the independently updatable field is below a predetermined threshold, thus ensuring document updating efficiency. For example, the predetermined threshold is 10. As an example, a metadata field such as author of the document may be determined as an independently updatable field. Assume that the author of the document is "LI MING", then the independently updatable field includes two items: "LI" and "MING". As the content of a document is usually long, the content of a document can be categorized as a non-independently-updatable field. However, when the document content includes only a few words (for example, less than 10 words), the document content can also be determined as an independently updatable field.

The method 300 comes to act 320. At act 320, the document index management module 140 creates an index for an item in the independently updatable field. The index may contain an identifier of a document comprising the item in a plurality of documents. At act 330, the document index management module 140 stores the identifier of the document in blocks in the storage module 141 such that the index is updatable without modifying the identifier of the document. Storing the identifier of the document in blocks can allow rapid update to a list of document identifiers associated with an item. Several example implementations of the index and its storage mode will be discussed below.

In some embodiments, the document index management module 140 stores the identifier of the document in at least one node of a hierarchical structure, in which each of the at least one node may include identifiers of at least part of a plurality of documents. For example, in some embodiments, the hierarchical structure comprises an index tree. An example of the tree may include but is not limited to B tree, B− tree, B+ tree and B* tree and so on. An index for an item in an independently updatable field can be organized in such a tree structure to realize rapid positioning of the index and efficient updating of the independently updatable field. Specifically, in some embodiments, a multi-level file pointer can be used to improve operating efficiency.

Figure 4:
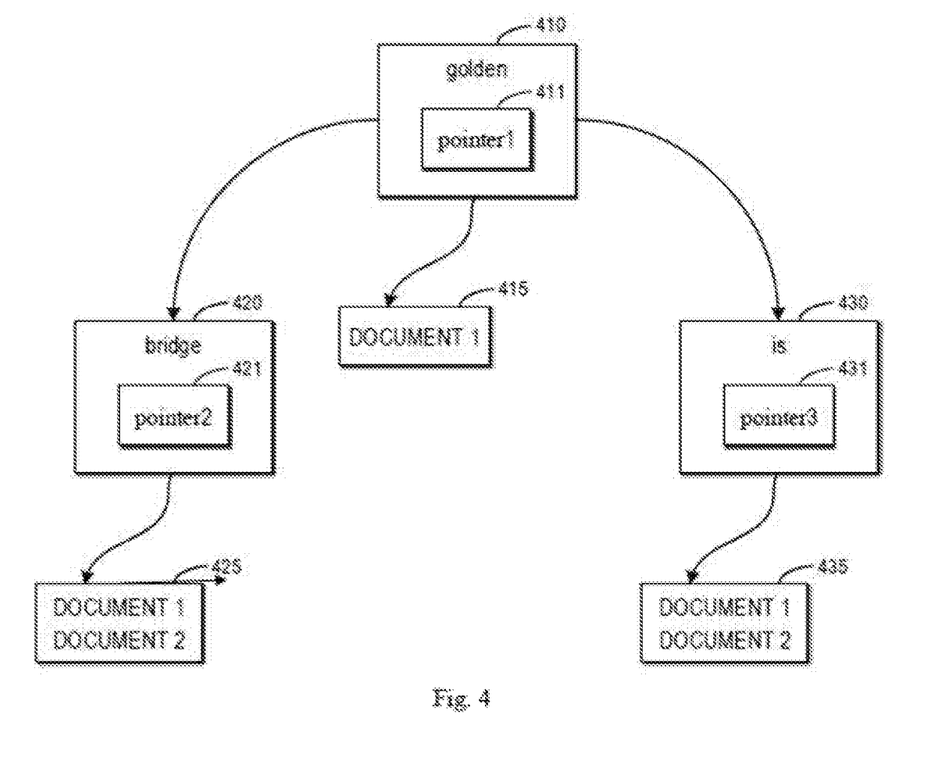
FIG. 4 illustrates an example for organizing an index for an item with B tree and file pointer.

FIG. 4 illustrates an example for organizing an index for an item with B tree and file pointer. FIG. 4 is based on document 1 and document 2 shown by block 211 in FIG. 2A. In FIG. 4, only tree items in B tree organization are shown: "golden" 410, "bridge" 420, "is" 430, which are linked to the respective list of document identifiers 415, 425 and 435 with pointer1 411, pointer2 421 and pointer3 431, respectively.

Alternatively or additionally, in some embodiments, the document index management module 140 stores the identifier of the document in at least one file block. Each of the at least one file block may include identifiers of at least part of a plurality of documents. Alternatively or additionally, in some embodiments, associate at least one file block in turn. The size of each file block can be predefined, and the number of document identifiers included in each file block can be the same or different. The number of document, identifiers included by each file block can be associated with the storage space occupied by a document identifier per se. For example, the storage bits occupied by the document identifier numbered 1 are fewer while the storage bits occupied by the document identifier numbered 10000 are more. Therefore, for a document identifier with a smaller serial number, one file block can contain more document identifiers of this sort. For a document identifier with a larger serial number, one file block may contain fewer document identifiers of this sort. For example, an index for an item in an independently updatable field is stored as:

item—>[document 1, document 4, document 10]—> [document 100, document 120]

where "[ ]" denotes a file block, and one or more document identifiers can be stored in each file block; "–>" denotes a file pointer with which a plurality of file blocks are associated with each other in turn. In this fashion, it is allowed that a certain document identifier is deleted from a file block or a certain document identifier is inserted into a file block. Furthermore, a new file block can be inserted into the list of file blocks. In an index, file blocks and identifiers of documents in a file block can be arranged in a particular order for fast positioning.

Moreover, it is to be understood that the document index management module 140 creates an inverted index of a plurality of documents for an item in a field other than an independently updatable field, namely, the indexes shown in FIGS. 2A and 2B. For an item in a non-independently-updatable field, the document index management module 140 creates an inverted index in a conventional approach. In other words, the index for an item in a non-independently-updatable field is stored such that an identifier of a document in the index should be modified when the document is updated.

Figure 5A:
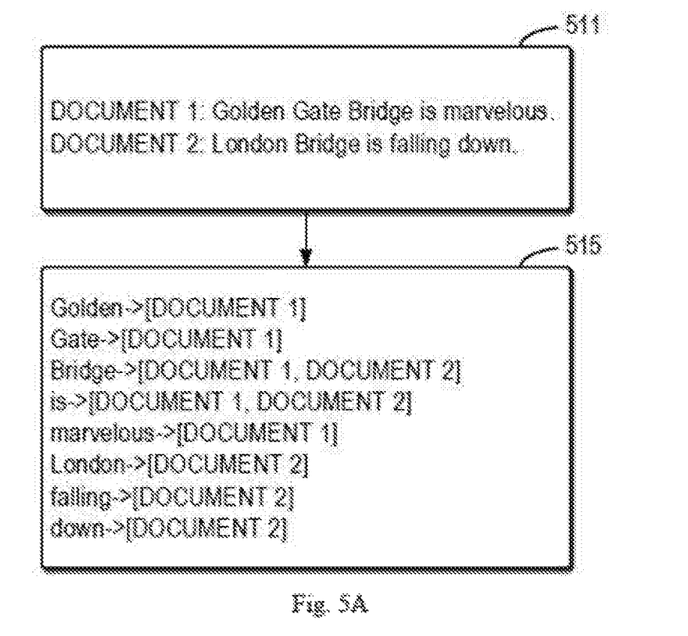
FIG. 5A illustrates a schematic diagram for creating an index for an item in two documents according to an embodiment of the present disclosure.

FIG. 5A illustrates a schematic diagram of creating an index for an item in two documents according to an embodiment of the present disclosure. Similar to block 211 in FIG. 2A, the block 511 of FIG. 5A shows the content of two documents, namely, document 1 and document 2, that is to say, the field, is the content of a document. Though only one field is shown here, in other embodiments, a document may include other fields such as subject, author, keywords, creation date, document category, comments and the like.

The block 515 of FIG. 5A is similar to the block 215 of FIG. 2A while the only difference lies in that the block 515 in FIG. 5A shows identifiers of documents in the index stored in blocks, where "[ ]" denotes a file block. In FIG. 5A, since there are only two documents, document 1 and document 2 are stored in one file block. When there are a lot of documents involved, there may be existed a plurality of file blocks.

The index for an item in an independently updatable field will not be stored in a document level in other forms to ensure that updating the application program interface 120 can update all occurrence of the index. The solution can be further expanded such that all occurrence of the index can be updated when the index is stored in a document level in other forms.

It should be noted that although an index for an item in an independently updatable field and an inverted index for an item in a non-independently-updatable field are stored in different manner, the upper layer interface is made the same as the application program interface of a conventional inverted index by packaging operations such as querying, adding, removing, and updating a field for the index with the application program interface 120, and the search engine 110 can read and write the index such that capabilities for other operations other than updating a document (for example, querying, adding, removing a document and the like) are the same as a conventional inverted index.

Specifically, operations for a non-independently-updatable field can be performed with an application program interface of a conventional inverted index; operations for an independently updatable field can be performed with the application program interface 120 according to an embodiment of the present disclosure, and the application program interface 120 packages operations of the index for an item in an independently updatable field. Operations for independently updatable fields and non-independently-updatable fields can be controlled respectively at a application program interface level.

Figure 6:
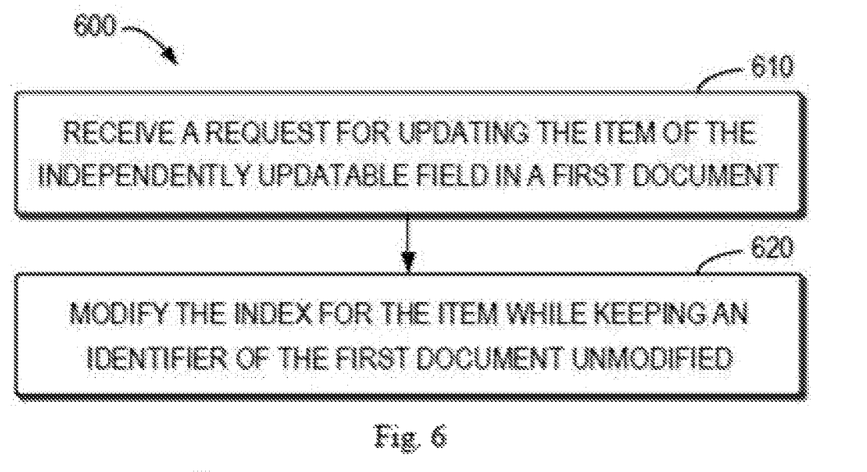
FIG. 6 illustrates a flowchart of a method of the usage of an inverted index according to an embodiment of the present disclosure.

A flowchart of a method 600 of the usage of an inverted index according to an embodiment of the present disclosure will be described below with reference to FIG. 6. It can be understood that the method 600 can be implemented following the method 300. At act 610, the document index management module 140 receives a request for updating an item of an independently updatable field in a first document from the client 130 via the search engine 110. In response to the reception of this request, at act 620, the document index management module 140 can modify the index for the involved item and keep an identifier of the first document unmodified. For the sole purpose of example, a specific example is considered in the following.

Assume that a user of the client 130 enters a new author in an interface offered by the search engine 110, where the author is determined as an independently updatable field. In response to the request for updating the field "author", the document index management module 140 positions and modifies the index for an item in the field "author" while keeping the identifier of the document that the field "author" belongs to unmodified, and keeping the inverted index for an item in fields apart from the field "author" unmodified. The purposes of modifying an index for an item are to delete an old relation between an item and a document identifier in the index and add a new relation between an item and a document identifier that does not exist before into the index, so as to replace a conventional approach that adds a new document identifier.

In some embodiments, the request involves removing an item from an independently updatable field in a first document, and modifying the index may include: deleting the identifier of the first document from the index for the item. In some embodiments, deleting the identifier of the first document from the index for the item includes deleting the index for the item in the case that only the identifier of the first document are included in the index for the item. In some embodiments, the request involves adding an item into an independently updatable field in a first document, and modifying the index may include: adding the identifier of the first document into a corresponding block of the index. In some embodiments, adding the identifier of the first document into a corresponding block of the index includes creating the index for the item in the case that the index for the item does not exist, where the index includes the identifier of the first document.

Figure 5B:
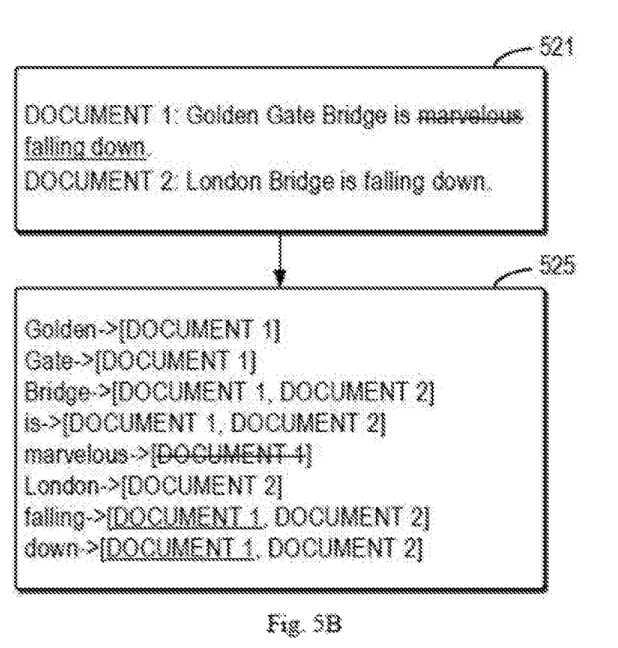
FIG. 5B illustrates a schematic diagram for updating a document in the example shown in FIG. 5A according to an embodiment of the present disclosure.

FIG. 5B illustrates a schematic diagram of updating a document in the example shown in FIG. 5A according to an embodiment of the present disclosure. Block 521 shows partial modification made to document 1, namely, updating document 1 (for example, "marvelous" is replaced with "falling down" in document 1); block 525 shows the index after the document 1 is updated. It can be seen that when receiving a request for updating a document (for example, document 1), the document index management module 140 keeps the identifier of document 1 unmodified, which is contrary to the example shown in FIG. 2B. Specifically, the identifier of updated document 1 is still "document 1". In this way, it is only necessary to modify indexes for a deleted item (for example, "marvelous") and added items (for example, "falling" and "down") in the field.

For a deleted item (for example, "marvelous"), modifying the index includes deleting the identifier of document 1 from the index for the item "marvelous" and for an added item (for example, "falling" or "down"), modifying the index includes adding the identifier of document 1 into a corresponding block of the index for the item "falling" or "down", Furthermore, thanks to the identifier of the document not being modified, it is unnecessary to make any modifications to an index for an item in fields apart from the content field shown by block 521, for instance, it is unnecessary to modify an index for an item in the author field. Therefore, the number of indexes for items that should be modified is reduced significantly, thereby improving the efficiency of document updating.

When the index includes the information of the position where an item appears in a document, modifying the index further includes modifying the position information of the item. In some embodiments, an item and its corresponding position information are associated with each other via a file pointer.

Furthermore, if a system has a large amount of documents, a delta for each document identifier should be stored to compress the document identifiers. If the delta for each document identifier is stored, it cannot be deleted when the document identifier is deleted, but instead it should be added with a deletion mark, which indicates that a relation between an item and the document is removed and the document identifier is still stored for reference afterwards. When an index merge is performed, a real deletion will take place. Under this condition, if an item is added to a field, then removed, and then again added, it is only necessary to modify the mark.

Figure 7:
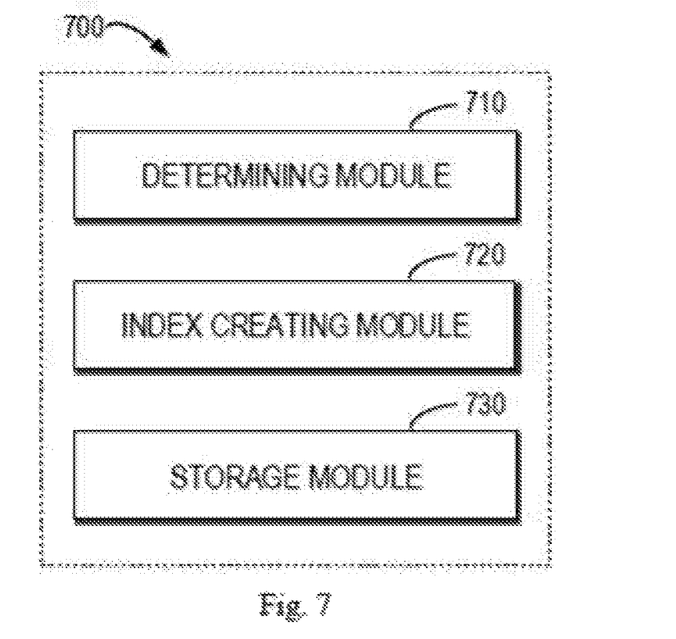
FIG. 7 illustrates a block diagram of an apparatus for managing a document index according to an embodiment of the present disclosure.

FIG. 7 illustrates a block diagram of an apparatus 700 for managing a document index according to an embodiment of the present disclosure. In some embodiments, the apparatus 700, for instance, can be implemented at the document index management module 140. Alternatively, in some embodiments, the apparatus 700 can be directly implemented as the document index management module 140 per se, namely the document index management module 140 can be implemented by the apparatus 700.

As shown in FIG. 7, the apparatus 700 may include a determining module 710 which is configured to determine an independently updatable field in a plurality of documents, the independently updatable field including at least one item. The apparatus 700 may further include an index creating module 720 which is configured to create an index for an item in the independently updatable field, the index containing an identifier of a document comprising the item, the document being included in the plurality of documents. Furthermore, the apparatus 700 may further include a storage module 730 which is configured to store the identifier of document in blocks such that the index is updatable without modifying the identifier of the document.

In some embodiments, the determining module 710 includes a determining unit which is configured to determine the independently updatable field from the plurality of documents such that the number of items included in the independently updatable field is below a predetermined threshold.

In some embodiments, the storage module 730 includes a first storage unit which is configured to store the identifier of the document in at least one file block, each of the at least one file block including identifiers of at least part of the plurality of documents. In some embodiments, the storage module 730 further includes an associating unit which is configured to associate the at least one file block in turn.

In some embodiments, the storage module 730 includes a second storage unit which is configured to store the identifier of the document in at least one node of a hierarchical structure, each of the at least one node including identifiers of at least part of the plurality of documents, where the hierarchical structure includes an index tree.

In some embodiments, the apparatus 700 may further include a further index creating module which is configured to create an inverted index of a plurality of documents for an item in a field other than an independently updatable field.

In some embodiments, the apparatus 700 may further include: a receiving module which is configured to receive a request for updating an item of an independently updatable field in a first document; and an index modifying module which is configured to modify the index for the item and keep an identifier of the first document unmodified.

In some embodiments, the request involves removing the item from the independently updatable field and the index modifying module includes a deleting unit which is configured to delete the identifier of the first document from the index for the item.

In some embodiments, the request involves adding the item into the independently updatable field and the index modifying module includes an adding unit which is configured to add the identifier of the first document into a corresponding block of the index.

For the sake of clarity, some optional modules of the apparatus 700 are not shown in FIG. 7. However, it should be understood that various features as described with reference to FIGS. 1 and 3-6 are likewise applicable to the apparatus 700. Furthermore, various modules of the apparatus 700 may be hardware modules or software modules. For example, in some embodiments, the apparatus 700 may be partially or completely implemented using software and/or firmware, e.g., implemented as a computer program product embodied on a compute readable medium. Alternatively or additionally, the apparatus 700 may be partially or completely implemented based on hardware, for example, implemented as an integrated circuit (IC) chip, an application specific integrated circuit (ASIC), a system on chip (SOC), a field programmable gate array (FPGA) and so on. The scope of the present disclosure is not limited in this regard.

Figure 8:
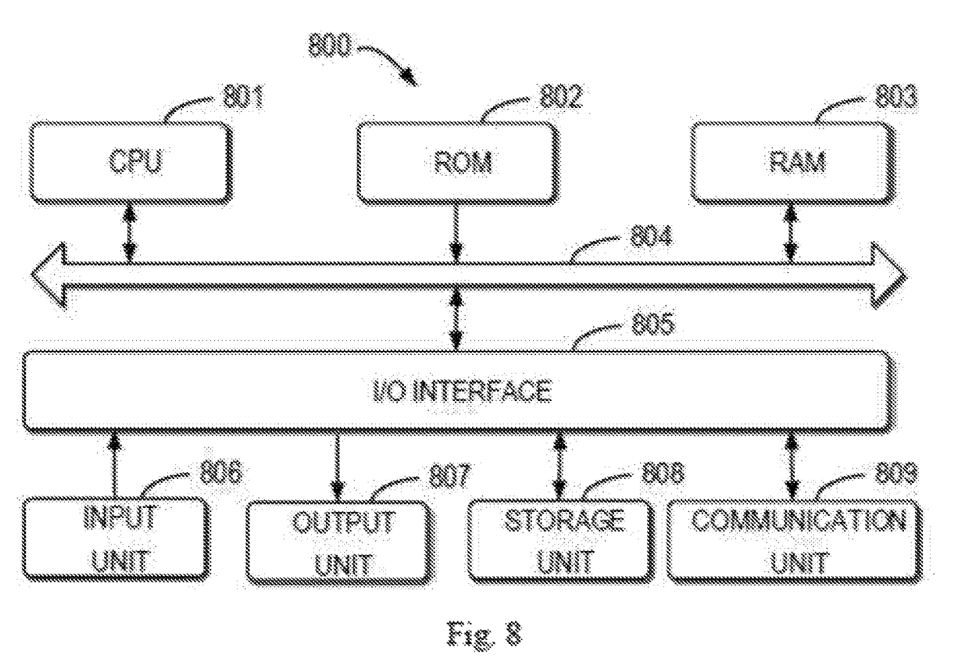
FIG. 8 illustrates a schematic block diagram of an example device that may be used to implement embodiments of the present disclosure.

FIG. 8 illustrates a schematic block diagram of an example device 800 that may be used to implement embodiments of the present disclosure. As shown in FIG. 8, the device 800 includes a central processing unit (CPU) 801, which may perform various appropriate actions and processes based on computer program instructions stored in a read-only memory (ROM) 802 or computer program instructions loaded from a storage unit 808 to a random access memory (RAM) 803. In RAM 803, there are also stored various programs and data required by the device 800 when operating. The CPU 801, ROM 802, and RAM 803 are connected to one another via a bus 804. An input/output (I/O) interface 805 is also connected to the bus 804.

A plurality of components of the device 800 are connected to the I/O interface 805, including: an input unit 806 comprising a keyboard, a mouse, and the like; an output unit 807 such as various types of displays, loudspeakers, and the like; a storage unit 808 including a magnetic disk, an optical disk, and the like; and a communication unit 809 including a LAN card, a modem, a wireless communication transceiver and so on. The communication unit 809 allows the device 800 to exchange information/data with other devices via a computer network, such as the Internet, and/or various telecommunications networks.

The above-described procedures and processes, such as the method 300, can be implemented by the processing unit 801. For example, in some embodiments, the method 300 can be implemented as a computer software program which is tangibly embodied on a machine readable medium, for instance, the storage unit 808. In some embodiments, part or all of the computer program can be loaded to and/or installed on the device 800 via the ROM 802 and/or the communication unit 809. The computer program, when loaded to the RAM 803 and executed by the CPU 801, may execute one or more acts of the method 300 as described above. Alternatively, the CPU 801 can also be configured to implement the method 300 as described above in any other proper manner (for example, by means of firmware).

In view of the above, the solution of the present disclosure lends itself to an application that in a real-time fulltext search system, frequently and partially updates a document (namely, only updates a certain field of the document) and trigger indexing in time. For an index for an item in an independently updatable field, embodiments of the present disclosure make the index updatable without modifying an identifier of a document by storing the identifier of the document in the index in blocks, thereby improving the flexibility to update a simple metadata field in a large document while keeping the capability of querying, adding and removing a document unchanged. With the embodiments of the present disclosure, since it is unnecessary to modify a identifier of a document, only the index for an item in an independently updatable field should be modified (and only the index for a changed item are modified while the index for an unchanged item in the independently updatable field stays the same) without touching the index for an item in an unchanged fields, which will reduce indexing load dramatically and improve indexing performance and will subsequently improve system capacity.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java. Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a document index, comprising:
   determining an independently updatable field in a plurality of documents, the independently updatable field comprising at least a first item and a second item, wherein determining an independently updatable field comprises determining the independently updatable field from the plurality of documents such that the number of items included in the independently updatable field is below a predetermined threshold;
   creating a first index for the first item in the independently updatable field, the first index containing an identifier of a document that includes the first item, the document being included in the plurality of documents;
   creating a second index for the second item in the independently updatable field, the second index containing an identifier of the document, the document also including the second item;
   storing the identifier of the document in blocks such that the first and second indexes are updatable without modifying the identifier of the document, wherein storing the identifier of the document in blocks includes storing the identifier in a first file block unique to the first index and storing the identifier in a second file block unique to the second index;
   receiving a request for removing the first item of the independently updatable field from the document; and
   in response to receiving the request for removing the first item, modifying the first index for the first item by deleting the identifier of the document from the first file block, while refraining from modifying the second file block of the second index, the identifier of the document remaining unmodified within the second index.

2. An apparatus for managing a document index, comprising:
   at least one processing unit;
   at least one memory coupled to the at least one processing unit and storing instructions to be executed by the at least one processing unit, the instructions, when executed by the at least one processing unit, causing the apparatus to:
   determine an independently updatable field in a plurality of documents, the independently updatable field comprising at least a first item and a second item, wherein determining an independently updatable field comprises determining the independently updatable field from the plurality of documents such that the number of items included in the independently updatable field is below a predetermined threshold;
   create first index for the first item in the independently updatable field, the first index containing an identifier of a document that includes the first item, the document being included in the plurality of documents;
   create a second index for the second item in the independently updatable field, the second index containing an identifier of the document, the document also including the second item;
   store the identifier of the document in blocks such that the first and second indexes are updatable without modifying the identifier of the document, wherein storing the identifier of the document in blocks includes storing the identifier in a first file block unique to the first index and storing the identifier in a second file block unique to the second index;
   receive a request for removing the first item of the independently updatable field from the document; and
   in response to receiving the request for removing the first item, modify the first index for the first item by deleting the identifier of the document from the first file block, while refraining from modifying the second file block of the second index, the identifier of the first document remaining unmodified within the second index.

3. The method according to claim 1, wherein storing the identifier of the document in blocks further comprises:
storing the identifier of the document in at least one node of a hierarchical structure, each of the at least one node comprising identifiers of at least part of the plurality of documents.

4. The method according to claim 1, further comprising:
creating, for an item in a field other than the independently updatable field, an inverted index of the plurality of documents.

5. The method according to claim 1, wherein the predetermined threshold is 10.

6. The apparatus according to claim 2, wherein storing the identifier of the document in blocks further comprises:
storing the identifier of the document in at least one node of a hierarchical structure, each of the at least one node comprising identifiers of at least part of the plurality of documents.

7. The apparatus according to claim 2, wherein the instructions, when executed by the at least one processing unit, further cause the apparatus to:
create an inverted index of the plurality of documents for an item in a field other than the independently updatable field.

8. The method according to claim 3, wherein the hierarchical structure comprises an index tree.

9. The apparatus according to claim 6, wherein the hierarchical structure comprises an index tree.

\* \* \* \* \*